(12) United States Patent
Shumaker et al.

(10) Patent No.: US 8,996,013 B2
(45) Date of Patent: Mar. 31, 2015

(54) METHOD AND SYSTEM FOR LOAD BALANCING OF LARGE FILE TRANSFERS ON A WIRELESS NETWORK

(71) Applicant: International Business Machines, Armonk, NY (US)

(72) Inventors: Spenser Edward Shumaker, Raleigh, NC (US); Erik Bradley Craig, Raleigh, NC (US); Daniel Brian Varga, Raleigh, NC (US); Erik Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/847,905

(22) Filed: Mar. 20, 2013

(65) Prior Publication Data
US 2014/0287758 A1  Sep. 25, 2014

(51) Int. Cl.
*H04W 36/00* (2009.01)
*H04W 36/02* (2009.01)

(52) U.S. Cl.
CPC .................................. *H04W 36/023* (2013.01)
USPC ..... 455/437; 455/436; 455/456.1; 455/452.1; 455/414.3

(58) Field of Classification Search
USPC .......................... 455/456.1, 452.1, 414.3, 513
See application file for complete search history.

(56) References Cited

U.S. PATENT DOCUMENTS

| | | | |
|---|---|---|---|
| 5,572,221 A | 11/1996 | Marlevi et al. | |
| 5,825,759 A | 10/1998 | Liu | |
| 7,948,931 B2 | 5/2011 | Shu et al. | |
| 8,031,595 B2 | 10/2011 | Hamilton, II et al. | |
| 2002/0155844 A1 | 10/2002 | Rankin et al. | |
| 2004/0185863 A1* | 9/2004 | Ogami | 455/452.1 |
| 2004/0248603 A1* | 12/2004 | Canoy | 455/513 |
| 2010/0323715 A1 | 12/2010 | Winters | |

* cited by examiner

*Primary Examiner* — David Q Nguyen
(74) *Attorney, Agent, or Firm* — David A. Mims, Jr.; Darcell Walker

(57) ABSTRACT

A method and system identifies a data file for transfer to a user. The invention also detects the movement of the user device from which the data file transfer was made and calculates a projected path for movement of the user device. Based on the projected path of movement, the sections of the requested data file are transferred in parallel to node areas where the user device is projected to move according to the projected path. As the user enters a node area, the section of the data file downloaded to that node area is locally transferred to the user device and thereby substantially reducing download time of a large data file.

13 Claims, 6 Drawing Sheets

METHOD AND SYSTEM FOR LOAD BALANCING OF LARGE FILE TRANSFERS ON A WIRELESS NETWORK

FIELD OF THE INVENTION

This invention relates to a method and system that balances the amount of data being transmitted over cellular networks which will decrease the amount of bandwidth required to perform data transmissions and will optimize the average time to transmit large date files. In particular, this invention relates to a method and system for optimizing the transfer of large files to a receiving device by balancing the transmission loads of nodes on a wireless network such that transmission times for file transfers remains at an optimal average across all nodes on the network.

BACKGROUND OF THE INVENTION

Cellular telephones are an integral part of society today. A substantial number of people throughout the world have and use cellular telephones. For many people, the cellular telephone is their primary means of communicating, and of receiving and sending information. Individuals use cellular telephones for personal business and also in the work environment to conduct business matters. Cellular telephones have become a convenient means to take pictures, record events and save and retain information. As technological advancements with regards to the cellular telephone occur, more features are available on the cellular telephone. People easily find new uses for the cellular telephone based on the new features. Many consumers pre-order the latest cellular telephone devices and often, there are long lines of consumer waiting to be the first to have the new devices with the latest technology.

Currently, with all of the new technical developments and the expanded uses for small mobile electronic devices, the cellular telephone industry is going through a major transition. Most of the original usage of cellular phones was voice usage. People used cellular phones to conduct verbal communication. A main type of cellular phone was the "feature" phone. These earlier phones did not have big screens and many of the current features and they were used primarily to make telephone calls. Today, there is the 'smart' phone. The current cellular phone devices have many more features than original cellular phones. As a result, people are finding more uses for these phones. Further, where the primary use of original cellular phones was voice, today people are using their cellular phone devices to transmit data (i.e. text and images). In fact, usage of cellular phones is becoming more to transmit data than voice. This shift in usage from voice to data is creating a challenging situation for the cellular phone network providers. The original design of cellular networks did not anticipate the increasing transmission of data. The increase in data traffic places a strain on the cellular network operations.

A conventional cellular network configuration 100 shown in FIG. 1 has antennas, radios and logic 102. The area 104 of each antenna (tower) device 102 is referred to the 'Node'. The cellular telephone devices 106 communicate with and through the cellular network through the antennas in the specific Node areas. Each node area also has a server computing device 108. In the cellular network 100, these server devices 108 communicate with a Core Radio Node Controller (RNC) 110. One RNC 110 may have connected to it a hundred Nodes 104. The connection between the Node B and RNC can be through a microwave link 112. Next the RNC can further connect to the core network. The core network can also have several RNCs connected to it. Because these communication links 110 between the RNC and the nodes and even a core network are microwave links, there is a limited amount of bandwidth available to transmit information across these microwave links. These communication links have plenty of bandwidth to transmit voice communications. However, with the increased use of data-driven applications such as browsing the web, texting and watching videos via their cellular phones, the bandwidth on these microwave links is approaching the capacity of use.

The cellular telephone design and the cellular telephone protocols are designed to enable a cell phone user to roam through a cellular network. Referring to FIG. 2, a cellular network 200 is comprised of several little cells 202. A user can transparently move from one cell to another cell. The user is not disturbed as they move between cells. In some locations, such as metropolitan areas, a cellular phone user can be in one location and can switch cell sites every few seconds and not notice. The cellular network addresses all of the switching from one cell to another cell for the user.

When a user is on a wireless network, whether it is a cellular telephone data network or WIFI network, many times towers 102 and access points are not being utilized to their full potential. Due to this fact, tower wireless networks remain basically unintelligent. Current technologies allow users to seamlessly travel from one access point to another without noticing any interruptions in service activities. However, with regards to downloading large data files interruptions can occur when moving from one access point (antenna tower) to another access point.

U.S. Pat. No. 7,697,508 to Hernandez-Mondragon, et al. describes a system for communication between a mobile node and a communications network for use with a communications network having one or more communications network nodes. This invention defines a foreign agent and communicates with the mobile node in a predefined region. The system includes a ghost-foreign agent that advertises a foreign agent so that the mobile node is aware of the foreign agent when the mobile node is located outside the predefined region. The system further includes a ghost-mobile node that signals the foreign agent in response to the foreign agent advertising and based upon a predicted future state of the mobile node.

U.S. Patent Application Publication number 20100323715 describes technologies that are generally related to predicting future mobile device locations and using the predictive information to optimize mobile communications service parameters. Mobile device locations may be predicted using real-time device location information, destination information, and location history. Predicted location information for a given device, and possibly other devices as well, may be used to adjust mobile communications service parameters such as handoffs, channel assignment, multipath fading response parameters, data rates, transmission modes, opportunistic scheduling parameters, location-based services, and location update rates.

Although these technologies do enhance the communications of electronic devices, there remains a need for a more seamless communication system that can optimize large file transfers while moving through nodes on a wireless network.

SUMMARY OF THE INVENTION

The present invention addresses bandwidth capacity problems when transferring large files while a user is moving across nodes of a wireless network. This invention comprises a method of analyzing the bandwidth capacity of wireless nodes, the moving patterns of end users inside a wireless node zone to predict when and where the user will transfer from one wireless node to another wireless node. The method of the invention determines the size of the data to be downloaded, the download speed, the amount of time and the amount of bandwidth required to download data to a wireless device.

The present invention will determine the capacity of the current node of the wireless device receiving the data and will determine if that wireless device is moving to a different node in the network. In practice, user movement is detected and a pattern of movement is determined. From this determination there is a prediction or projection of the path of the user. Based on the movement of the user, size of the file that is being transferred and the transfer rate, the present invention can predict the amount of a file that will be transferred to a user while the user is in a certain node area. The present invention can also determine the download speed of the transfer based on the capacity of the current tower of the user device. Based on the size of the file being download, the capacity of the current node receiving the downloaded file and the capacity of the predicted future node of the device, the present invention can adjust downward the download speed of the file in the current node and the adjust upward the download speed of the file once the user device has moved to the next node which has more available download capacity. By adjusting the download speeds of the file being transferred, the average download time for the file is the same. However, because of the reduced download speed in the initial node, the average download speed is that node remains at an optimal level.

DETAILED DESCRIPTION OF THE INVENTION

The method and system of the present invention provide a means to provide seamless transfer of large files across network nodes with optimal bandwidth usage by balancing the download functions of network nodes. The objective of the present invention is accomplished by distributing the download functions of devices moving between nodes and thereby reducing load capacity of nodes having heavy usage at a particular time. Download speeds for devices moving between nodes will be reduced while the device is in a heavy capacity use node and increased when the device moves to a node having a lower use capacity. This load balancing process occurs by:

1) determining the size of a file to be transferred to a user;
2) predicting the path of the user;
3) determining the current load at each node in the network; and
4) determining whether load balancing can occur based on the movement of the user and the current load of nodes in user's predicted path.

When the determination is that load balancing can occur, the download speed of the file to the user device is reduced when the user is in a load capacity node area. Reducing the download speed of this user enables the download speed of another user in that same node area to increase. When the user moves to the node area with less use, the download speed of the file to the user will increase such that the total time to download a file is optimized. The increased download speed in the second node compensates for the slower download speed in the first node such that the total download is optimal.

Figure 1:
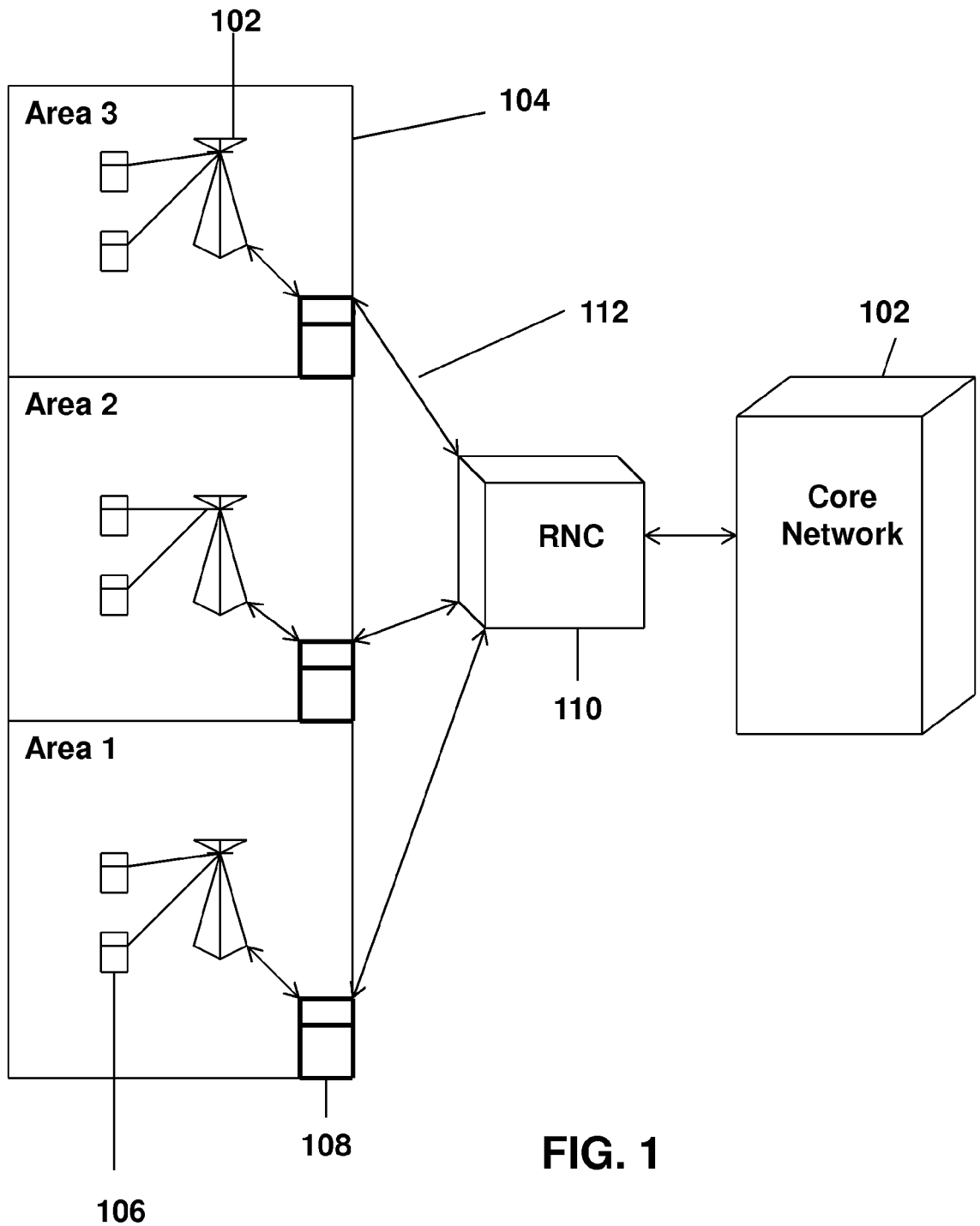
FIG. 1 is an illustration of a cellular network configuration containing a network core, radio node controller (RNC) and multiple Node B area cell sites.
Figure 2:
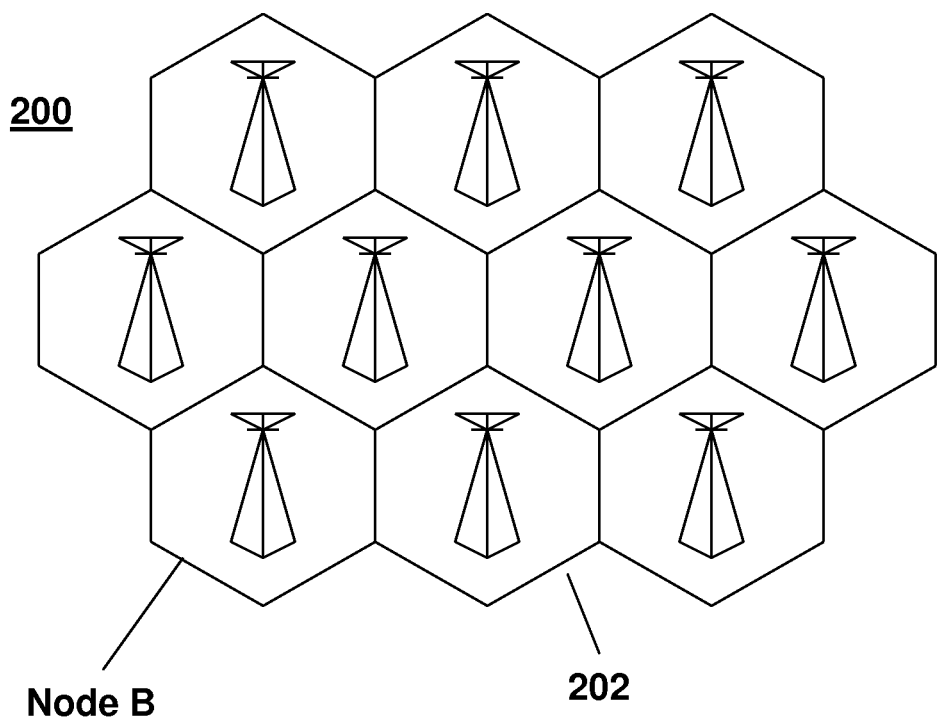
FIG. 2 is a display of several Node B cell sites comprising a network of adjacent cellular sites, each cell site having an antenna, radio and logic.
Figure 3:
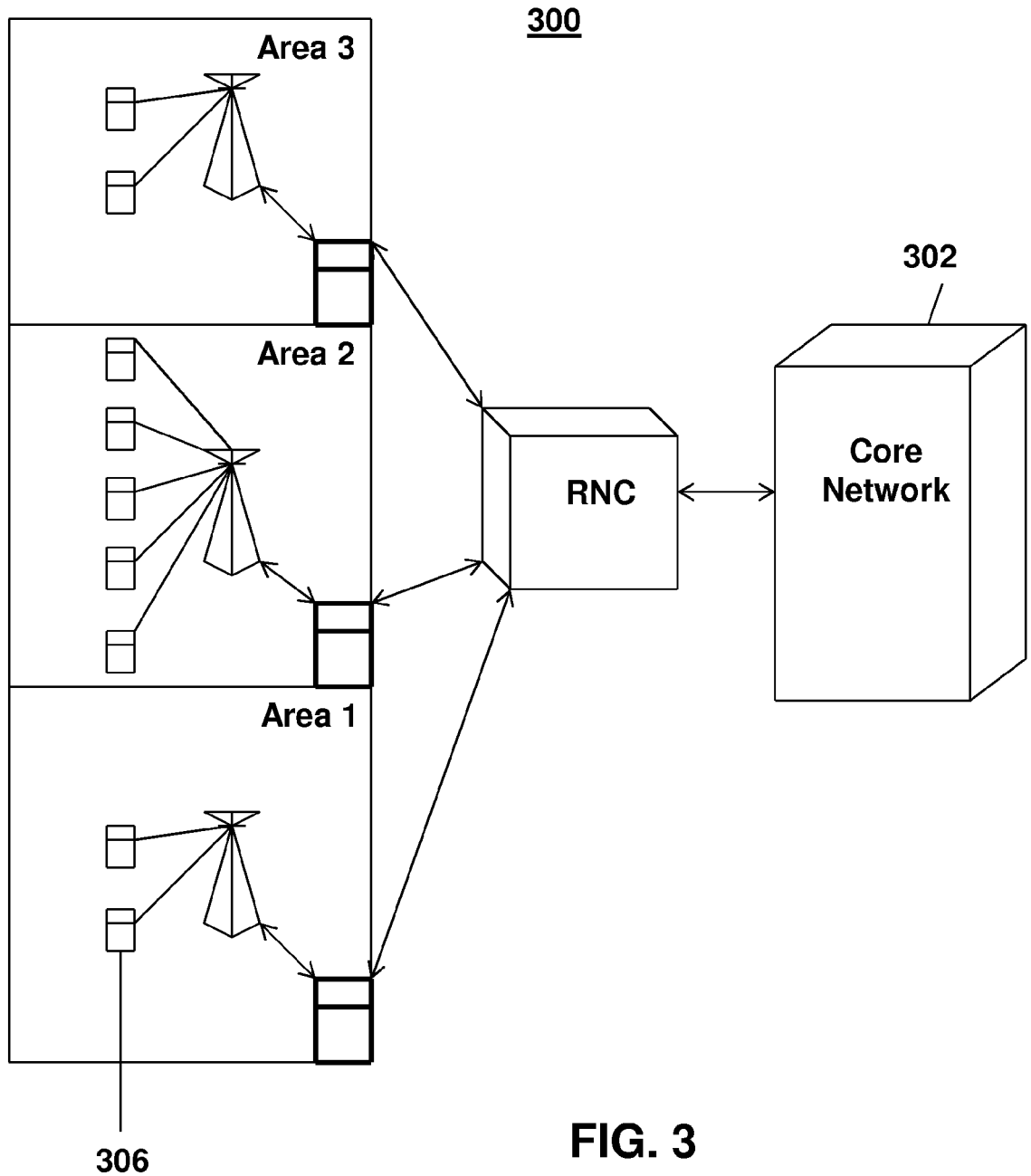
FIG. 3 is an illustration of a cellular network configuration containing a network core, radio node controller (RNC) and multiple Node B cell sites with different load demands.

FIG. 3 is an illustration of a cellular network configuration containing a network core, radio node controller (RNC) and multiple Node B cell sites with different load demands. This configuration shows three node areas with different use loads. As shown, Area 2 currently has five downloads from five devices 306, while Area 1 and Area 3 each only have two current downloads. As a result of the different load usages, downloads in Area 2 require more bandwidth and will generally download at slower speeds because of the greater demand. Each Area generally has an average download speed. When the use increases, the average speed can reduce for each download to simultaneously download data to each device.

Figure 4:
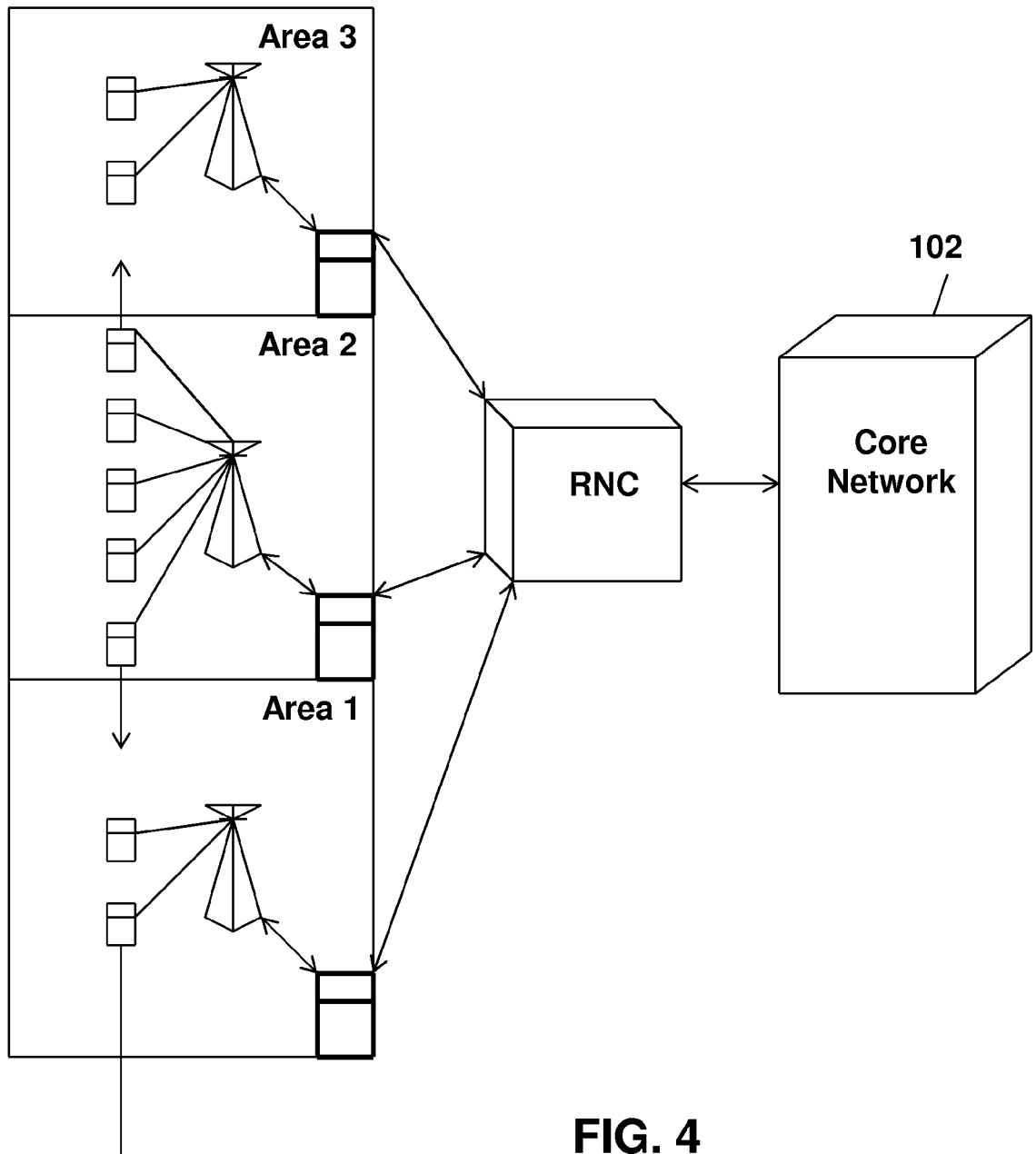
FIG. 4 is an illustration of a cellular network configuration showing movement of cellular devices between node areas.

FIG. 4 illustrates a cellular network configuration when devices in Area 2 are moving though that area and possibility into other area. As shown, when devices 306 from Area 2 move into Area 1 and Area 3 the download times for devices in Area 2 can increase because of the reduced capacity in Area 2.

Figure 5:
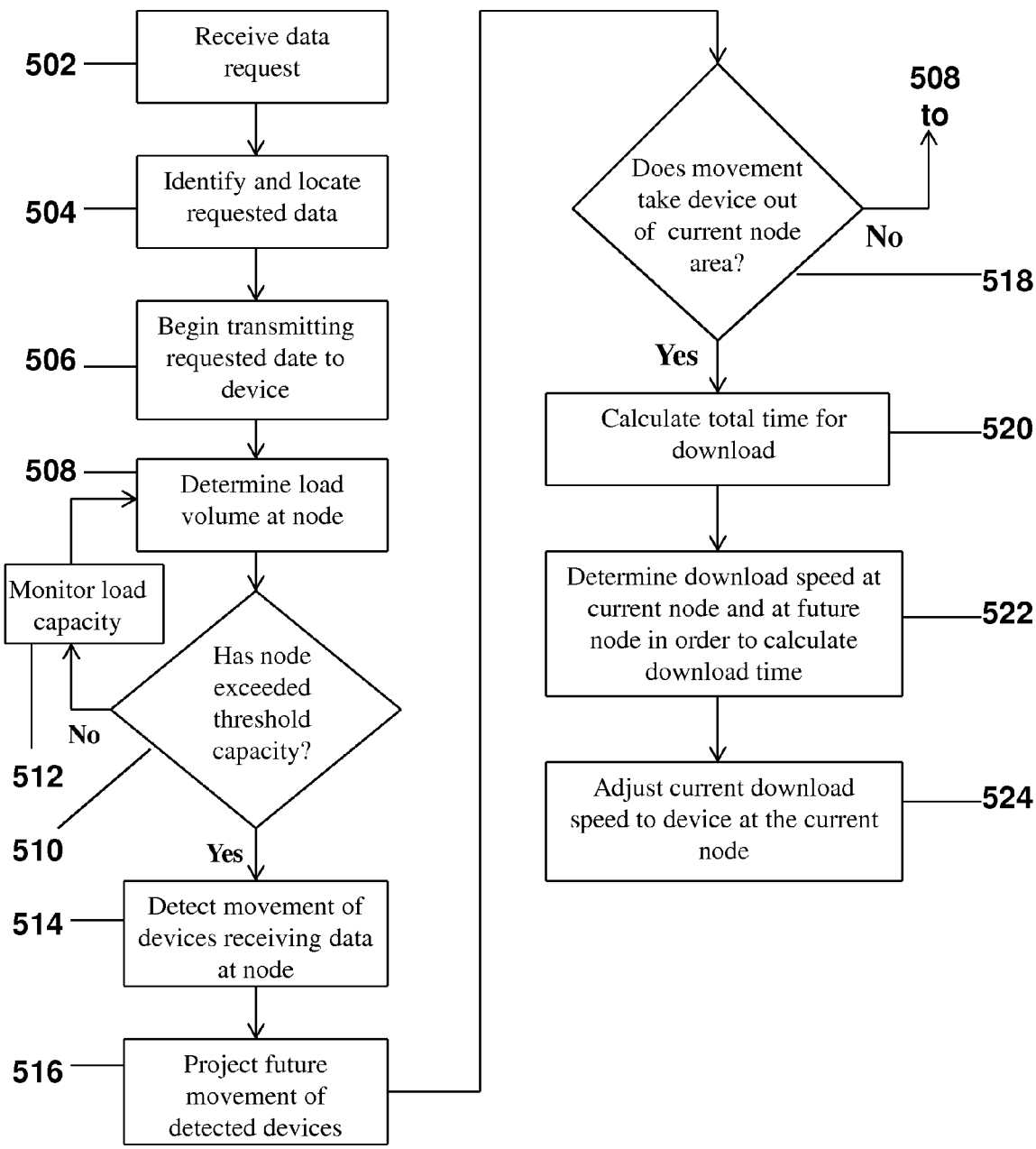
FIG. 5 is a flow diagram of the steps in a general implementation of the method of the present invention.

Referring to FIG. 5, In the method of the invention, in step 502, there is a request for data from a mobile device 306. Once a request is received step 504 identifies and locates the requested data. The Network Core 102 and RNC 110 are components that can perform this function. In step 506, the invention begins downloading the requested data to the requesting device via the node area of the requesting device. After the initiation of the downloading process in step 506, step 508 begins to determine the current load volume at that node tower. As part of the determination of the volume at the particular node area, step 510 determines if the current volume of use at a node has exceeded a threshold capacity for that node. For example, a threshold capacity could be 90 percent use of the capacity. Once the capacity reaches 90 percent, the node has reached the threshold capacity. This threshold capacity is an arbitrary number that can be set for any particular system or any particular node area in a system. This threshold number serves as one of the markers to initiate load balancing activities of the present invention. If the determination in step 510 is that the capacity is below the threshold capacity, then the process goes into a monitoring state in step 512.

Referring back to step 510, if the determination is that the use capacity at the specific node has reached the threshold capacity, then the process moves to step 514 which attempts to detect movement of devices receiving data at the specific node area. In this step, the method can monitor each device in the specific area that is receiving data and determine the size of the data that the device is receiving and the amount of data that the device has yet to receive. The objective at this point is to determine which devices may be moving to other node areas that are below their threshold capacity. Devices receiving data that are moving to other nodes that are below their threshold capacity may be candidates for load balancing. When step 514 detects the movement of a device receiving data, step 516 projects the path of future movement for that device. As part of the process of projecting the path of future movement of the device, step 518 determines whether the future movement of the device will take the device out of the current node area and into a different node area. If the determination is that the projected movement of the device will not take the device out of the current node area, then that device is not a likely candidate for the load balancing of the present invention. In this event, the method would return to the monitoring step 512.

Referring to step 518, when the determination is that the projected movement of the device will take the device out of the current node area, step 520 calculates a total download time for data to that device. This initial download calculation time is based on the size of the data download and the standard (average) download speed at the current node zone. The standard speed is the download speed at the node area under a normal load capacity. After the calculation of the total download time, step 522 calculates a reduced download time at the current node zone and an increased download time at the projected new node zone such that the total download would be the same. After the calculations of the reduced and increased download speeds, step 524 adjusts the speed of the download to the specific device. In practice, the initial reduction in the download speed of the specific device that will be moving to another node zone will facilitate the increase of download speed(s) of other devices in the high capacity node area.

Figure 6:
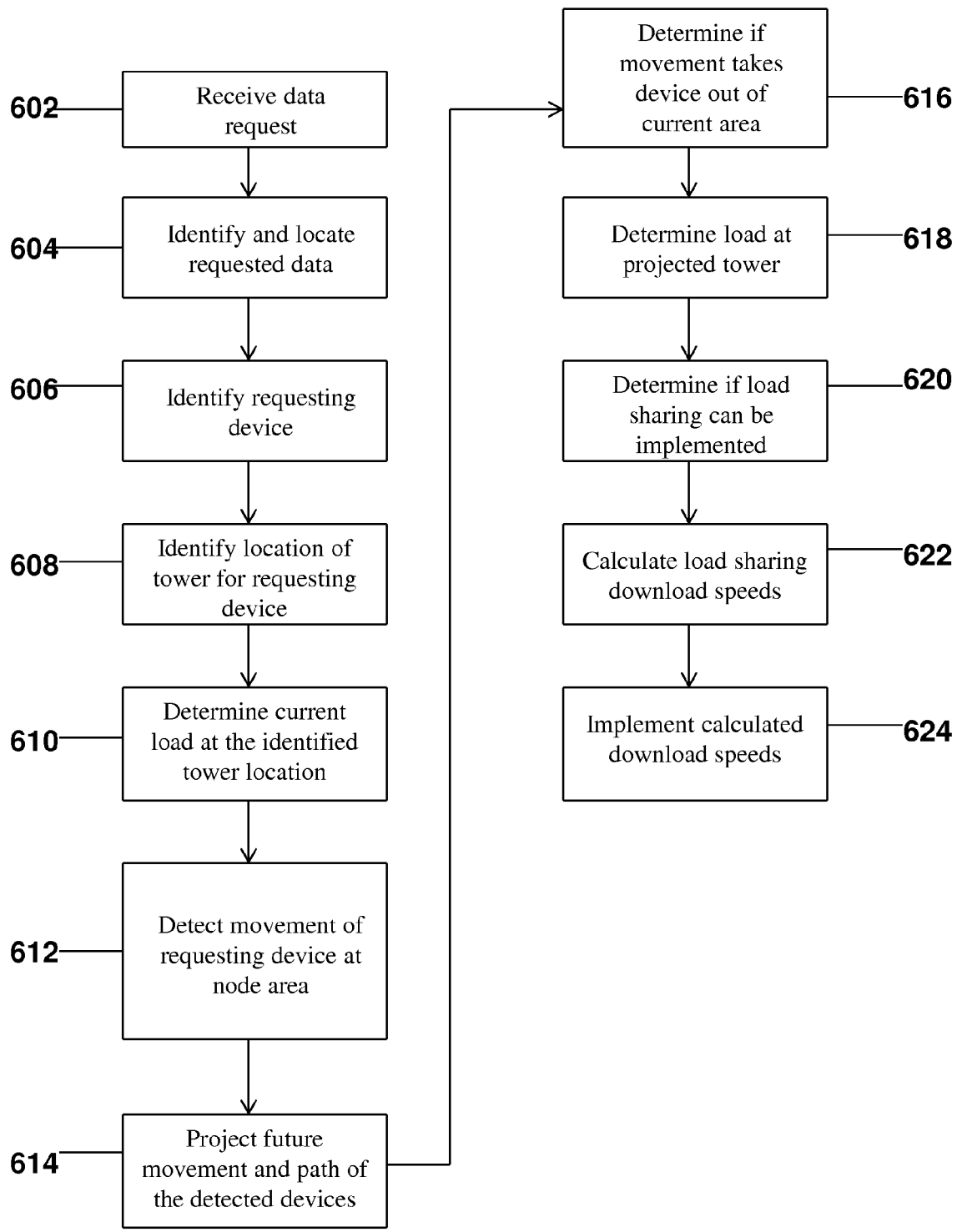
FIG. 6 is a flow diagram of the steps in an alternate implementation of the method of the present invention.

FIG. 6 illustrates an alternate embodiment of the method of the present invention. As with the method in FIG. 5, steps 602 and 604 receive a data download request from a device and identify and locate the requested data for download. Step 606 identifies the requesting device. This identification function can also be part of 602. In step 608, there is a determination of the area tower through which the specific device made the data download request. Step 610 determines the current load volume at that node tower where the requesting device is located. Step 612 begins the load balancing function of the method of the present invention. This step, 612, detects movement of devices receiving downloads at the current node area. When device movement is detected, step 614 projects the future movement of the device. Step 616 next determines whether any detected device movement takes the device outside of the current node area. When the determination is that the movement takes a device outside of the current node area and into an identified new node area, step 618 determines the current load at the newly identified node area. Based on the current load of the newly identified node area, step 620 determines whether load balancing can be implemented for a particular device. When the determination is that load sharing can be implemented for a particular device, step 622 calculates the total download time for the device based on the standard download speed at the current node area. After calculation of the total download time, calculation of a reduced download speed at the current node area and the increased download speed at the newly identified area is completed. In step 624, the newly calculated download speeds are implemented.

It is important to note that while the present invention has been described in the context of a fully functioning cellular network system, those skilled in the art will appreciate that the components and processes of the present invention are capable of being distributed in the form of instructions in a computer readable storage medium and a variety of other forms, regardless of the particular type of medium used to carry out the distribution. The method of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

We claim:

1. A method for optimizing large file transfers while moving through nodes on a wireless network comprising:
   receiving a data request at a network core from a mobile cellular device;
   identifying and locating data of the received data request;
   determining whether the mobile cellular device making the request is moving;
   when the determination is that the mobile cellular device is moving, projecting a path for which the mobile cellular device will move;
   identifying node areas through which the mobile cellular device will travel based on the projected path;
   calculating and dividing a data file into sections of various sizes for download to each identified node area based on the projected movement path of the mobile cellular device and download speed of the data file to the mobile device.

2. The method for optimizing large file transfers as described in claim 1 further comprising before said determining whether the mobile cellular device making the request is moving, determining a load volume at a receiving node where the data request was mode.

3. The method for optimizing large file transfers as described in claim 2 further comprising after said determining a load volume at a node where the data request was mode, determining load capacity at the receiving node.

4. The method for optimizing large file transfers as described in claim 3 further comprising after said projecting a path for which the mobile cellular device will move, determining whether the projected path the mobile cellular device will take the mobile cellular device out of the area of the receiving node.

5. The method for optimizing large file transfers as described in claim 1 further comprising before said determining sections of a data file for download to each identified node area, calculating a total download time for the requested data.

6. The method for optimizing large file transfers as described in claim 5 further comprising determining download speed at a current node and at a future node in order to determine download time.

7. The method for optimizing large file transfers as described in claim 6 further comprising adjusting a current download speed of the mobile cellular device at the requesting node based on determined download speed at a current node and at a future node.

8. A method for optimizing large file transfers while moving through nodes on a wireless network comprising:
   receiving a data request at a network core from a mobile cellular device;
   identifying the mobile cellular device from which the data request was received;
   identifying and locating data of the received data request;
   identifying a location of a tower of a node location for the requesting mobile cellular device;
   determining if a load sharing process can be implemented at the node location for the requesting mobile cellular device;

when the determination is that a load sharing process can be implemented, calculating download speeds for various data files being downloaded at the for the requesting mobile cellular device; and adjusting download speeds for one or more of the various files being downloaded at the node for the requesting mobile cellular device.

9. The method for optimizing large file transfers as described in claim 8 further comprising before said determination if load sharing can be implemented, detecting movement of the requesting mobile cellular device in the node area of the requesting device.

10. The method for optimizing large file transfers as described in claim 9 further comprising when movement of the requesting mobile device is detected, projecting a future movement and path of the requesting mobile device.

11. The method for optimizing large file transfers as described in claim 8 further comprising detecting movement of various devices downloading files in the node area and projecting a future movements of mobile devices for which movements are detected.

12. The method for optimizing large file transfers as described in claim 11 further comprising determining if detected movements of various devices downloading files in the node area takes a devices out of the node area.

13. The method for optimizing large file transfers as described in claim 12 of various devices downloading files in the node area further comprising:

determining a projected load at the projected tower of the node; and adjusting download speeds for one or more of the various files being downloaded at the node for the requesting mobile cellular device.

* * * * *